US009692753B2

(12) United States Patent
Johnson

(10) Patent No.: US 9,692,753 B2
(45) Date of Patent: Jun. 27, 2017

(54) PASSWORD ENCODE CARD SYSTEM AND METHOD

(71) Applicant: Daniel T. Johnson, Lake Elmo, MN (US)

(72) Inventor: Daniel T. Johnson, Lake Elmo, MN (US)

(73) Assignee: SAFECARD, LLC, Lake Elmo, MN (US)

( * ) Notice: Subject to any disclaimer, the term of this patent is extended or adjusted under 35 U.S.C. 154(b) by 437 days.

(21) Appl. No.: 14/157,649

(22) Filed: Jan. 17, 2014

(65) Prior Publication Data

US 2015/0207791 A1 Jul. 23, 2015

(51) Int. Cl.
*H04L 29/06* (2006.01)

(52) U.S. Cl.
CPC ........ *H04L 63/0853* (2013.01); *H04L 63/083* (2013.01)

(58) Field of Classification Search
CPC . H04L 63/083; H04L 63/0853; H04L 9/0861; G06F 21/31; G06F 21/34
See application file for complete search history.

(56) References Cited

U.S. PATENT DOCUMENTS 5,961,593 A * 10/1999 Gabber ............... G01M 13/021 370/329
6,081,893 A 6/2000 Grawrock et al.
7,735,122 B1 * 6/2010 Johnson ............... G06Q 20/383 705/74
8,281,145 B2 10/2012 Rasti
2006/0036547 A1 * 2/2006 Yasuhara ............... G06Q 20/40 705/44
2011/0055585 A1 3/2011 Lee

OTHER PUBLICATIONS

Raghuvanshi, Paper based password management systems, Nov. 2013, Printed from the Internet on Oct. 17, 2015: <URL: http://www.webstruck.org/internet/paper-based-password-management-system/64/>.*
Master Password, Dec. 2013, Retrieved from the Internet on Oct. 17, 2015: <URL: https://web.archive.org/web/20131221034228/http://masterpasswordapp.com/>.*
passwordchart.com, http://passwordchart.com, Printed Sep. 27, 2013.
passwordcard.org, Welcome to your PasswordCard, http://www.passwordcard.org/en, Printed Sep. 30, 2013.

* cited by examiner

*Primary Examiner* — Minh Dinh
(74) *Attorney, Agent, or Firm* — Beck Tysver Evans, PLLC

(57) ABSTRACT

A system and method is presented for use of a password encode card to create multiple random passwords at a variety of computerized service providers. The encode card contains a plurality of ciphers, each assigned to a different service provider. Using only a single memorized master password, the user encodes the master password using the appropriate cipher and then uses the encoded password at that service provider. The card can be implemented as a plurality of substitution ciphers printed on a single card, or as an electronic card capable of either displaying a plurality of substitution ciphers or of implementing the plurality of ciphers on the inputted text of the master password.

21 Claims, 6 Drawing Sheets

300
Start
305
Navigate to Desired Service on User Computer Over Network
310
Select Desired Service on Encode Card
315
Encode a Master Password Based on Encode Card Cipher for Desired Service
320
Manually Entered Encoded Password through Keyboard
325
Use Desired Service
330
Navigate to Desired Service on User Computer Over Network
335
Select Second Service on Same Encode Card
340
Encode Master Password Based on Encode Card Cipher for Second Service
345
Manually Entered Encoded Password through Keyboard
350
Use Second Service
355
End 10
102
Password
100
Password
Encode Card
110
Keyboard
120
User Computing
Device
122
Processor
124
Memory
126
Network
Interface
130
Network
140
Server 1
142
Processor
144
Memory
Customer Data
146
148
P/W
Encode #1
150
Server 2
152
Processor
154
Memory
Customer Data
156
158
P/W
Encode #2
160
Server 3
162
Processor
164
Memory
Customer Data
166
168
P/W
Encode #3
170
Web Server 4
172
Processor
174
Memory
Customer Data
176
178
P/W
Encode #4

PASSWORD ENCODE CARD SYSTEM AND METHOD

FIELD OF INVENTION

The present application relates to the field of password generation for computerized systems. More particularly, the described embodiments relate to a card that contains a plurality of ciphers to provide a repeatable encoding of a user's memorized password appropriate for a selected system.

SUMMARY OF THE INVENTION

The present provides a secure yet easily implemented technique for using a different random password for each of a plurality of computerized service providers. In one embodiment, a user memorizes a single master password for use on multiple websites or other network accessible servers. The user than utilizes a physical password encoding card to encode the master password for each network location. The card provides a different encoding algorithm for each location, so that the actual password used for each location is never reused for a different location.

In one embodiment, the card is implemented as a plurality of substitution ciphers printed on a single card. The user assigns each cipher to a different network location, and then uses the appropriate cipher whenever logging into their account at that location. In another embodiment, the card is implemented as an electronic card capable of either displaying a plurality of substitution ciphers or of implementing the plurality of ciphers on the inputted text of the master password.

Because the algorithms are stored on a small, physical card, the user can carry the card with them wherever they go. When the user wishes to access an account on one of these network service providers, they simply remember their master password, encode the password with the appropriate cipher algorithm for that service provider, and then input the encoded password. No software needs to be installed on the local computer, meaning that the system can be used on guest computers or smart phones without needing to install additional software or apps. Because only algorithms are stored on the card, there is no security issue if the card is lost or stolen, as the new possessor of the card will have no knowledge of the user's master password. Because only one password is required to be memorized by the user, the system is easy to implement for the user.

DETAILED DESCRIPTION

Figure 1:
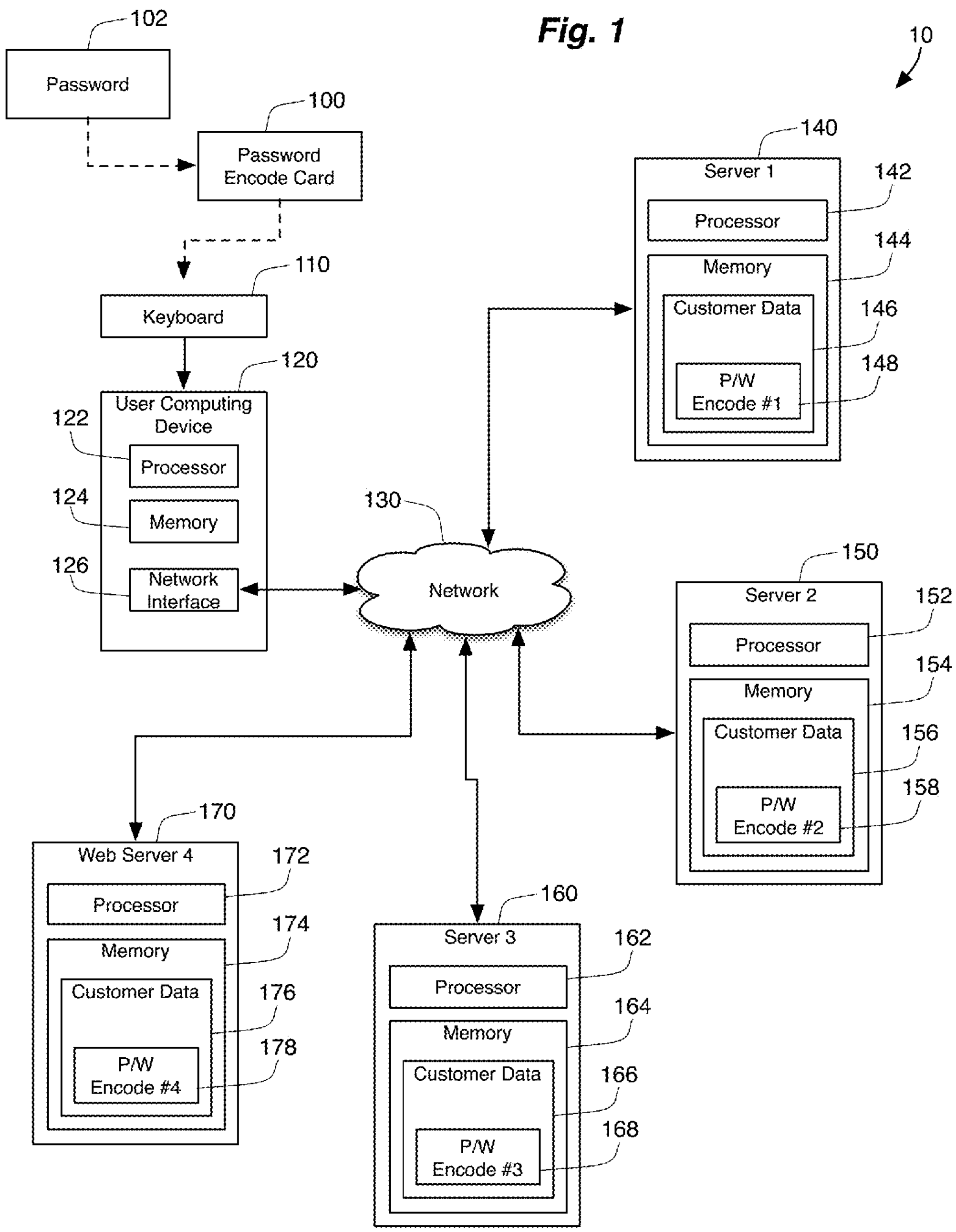
FIG. 1 is a schematic diagram showing the primary components of one embodiment of the present invention.

FIG. 1 shows the computerized environment 10 in which one embodiment of a password encode card 100 may be used. The password encode card 100 is designed to assist a user operating a user computing device 120 in managing passwords at a plurality of servers 140, 150, 160, and 170. Each of these servers 140, 150, 160, and 170 provides a separate, desired service to users over a wide area network 130. In one embodiment, this network 130 is the Internet. The servers 140, 150, 160, 170 may be web servers operating on the World Wide Web, with the user accessing these servers 140, 150, 160, 170 utilizing a web browser operating on the user computing device 120. Alternatively, one or more of these servers 140, 150, 160, 170 could provide data to specialized applications operating on the user computing device 120, each of which directly accesses data and services from servers 140, 150, 160, 170 that are designed to operate with those application.

The user computing device 120 may take the form of a personal computer, having a digital processor 122 and a non-transitory, tangible memory device 124, such as a hard drive, RAM, PROM, flash memory, or some other form of read/write physical memory. In a personal computer, the processor 122 generally takes the form of a general purpose CPU, such as those provided by Intel Corporation (Mountain View, Calif.) or Advanced Micro Devices, Inc. (Sunnyvale, Calif.). Residing on the memory 124 are a plurality of programs, which constitute instructions for execution on the digital processor 122. Included among these programs would be a web browser and a computer operating system, such as MAC OS (from Apple Inc. of Cupertino, Calif.) or the WINDOWS operating system (from Microsoft Corporation of Redmond, Wash.). The user computing device 120 further includes a network interface 126 that allows the device 120 to communicate with remote computing devices 140, 150, 160, 170 over network 130. In one embodiment, the data network interface 126 connects the device 120 to a local wireless network that, in turn, provides connection to the wide area data network 130. In one embodiment, the local network is based on TCP/IP, and the data network interface 126 includes a TCP/IP protocol stack.

In other embodiments, the user computing device 120 may be a smart phone or tablet computer running on a mobile device operating systems such as iOS (from Apple Inc.), WINDOWS PHONE (from Microsoft Corporation), or ANDROID (from Google Inc. of Menlo Park, Calif.). In these cases, the processor 122 is likely a mobile specific processor, such as those designed by ARM Holdings (Cambridge, UK). This processor would then operate small apps, which could be general-purpose web browsing apps or special purpose apps that connect to the servers 140, 150, 160, 170 over network 130.

Each of the servers 140, 150, 160, and 170 can be implemented as a single server computer having a processor 142, 152, 162, 172 and tangible, non-transitory memory 144, 154, 164, and 174, respectively. Alternatively, the servers 140, 150, 160, 170 can be implemented using a plurality of separate computers operating together under common programming to function as a single, logical server. As shown in FIG. 1, each server 140, 150, 160, 170 maintains customer data and password information 146, 156, 166, 176 in their memory 144, 154, 164, 174. Some servers may use this password information to ensure that only authorized customers access the services provided by the server. Other servers use this password information to maintain confidential financial information about the customer.

Numerous experts have advised users of network services to create hard-to-guess passwords for their various Internet accounts. Furthermore, these experts advise users to avoid using the same password at multiple sites. However, users find it difficult to remember and keep track of multiple, hard-to-guess passwords. As a result, users frequently fail to heed the advice of these experts. While software programs have been developed to help manage a user's set of hard-to-guess passwords, these programs are usually difficult for novice users to install and maintain. Even when the password managers are operating correctly for a user, they typically do not function seamlessly between all of the user's computing devices. As a result, even users who should know better frequently re-use passwords across multiple service providers, use easy-to-guess passwords, or even write down difficult to remember passwords on papers that could be found and used by nefarious parties.

The password encode card 100 is designed as an extremely easy to implement aid that allows users to maintain different, hard-to-guess passwords at a plurality of network service provider servers 140, 150, 160, 170. The password encode card 100 is a physical card that is utilized separately from the user computing device 120. The user need only remember a single master password 102. This same password forms the key for all of the user's accounts, so it is not necessary to remember numerous passwords or to re-use passwords across sites. The system 10 works by using the password encode card 100 to encode the master password separately using different cipher systems for each server 140, 150, 160, 170. The password encode card 100 is used when the password is originally established, and then re-used every time the password is requested. When an encoded version of the master password 102 is required, the user encodes the master password 102 using the appropriate cipher and then types the encoded password into a keyboard 110 that accepts input for the user computing device 120. There is no need for any of the computers and servers 120, 140, 150, 160, 170 to have knowledge that the password has been encoded, or how to de-code the password.

Figure 2:
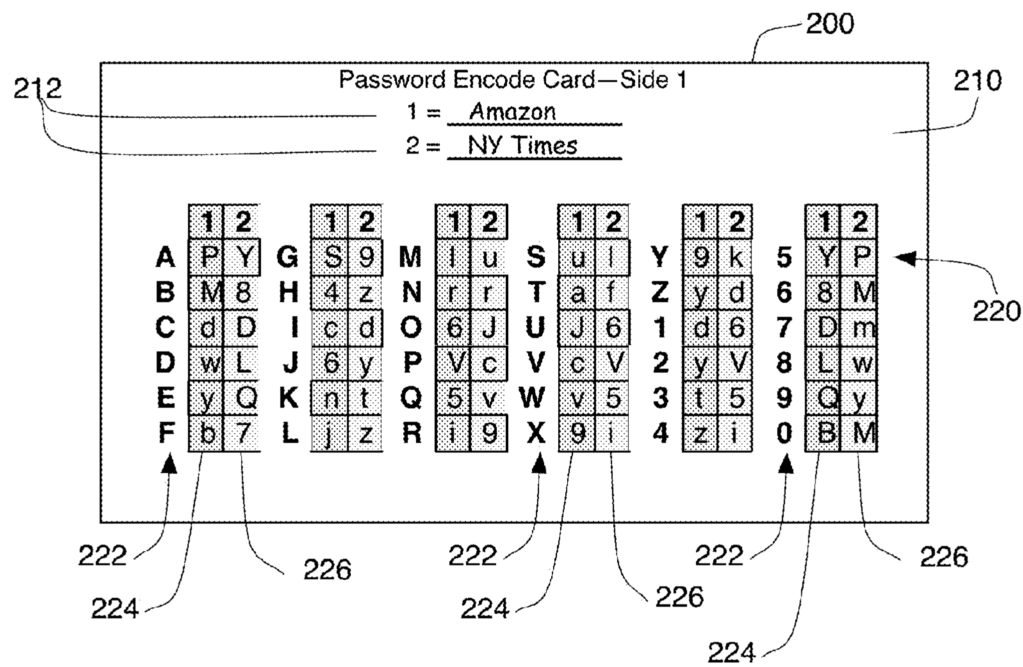
FIG. 2 shows a front and back view of a printed password encode card.
Figure 2:
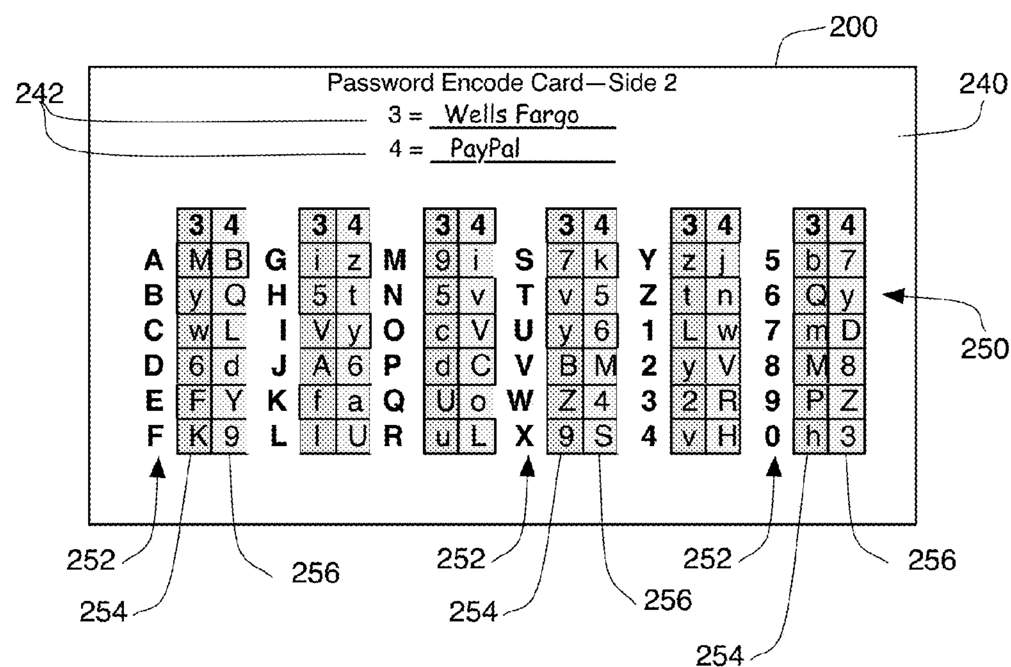

FIG. 2 shows one embodiment of a printed password encode card 200. This card was printed on a first side 210 and a second side 240, both of which are shown in FIG. 2. This particular card 200 can be used for four different servers, such as servers 140, 150, 160, and 170. The card 200 has printed upon it a different cipher for each service provider. When the user wishes to assign one of the ciphers to a server/service, they simply write the name of the service provider using that server in one of the blanks 212, 242. The first side 210 of card 200 shows that cipher 1 has been assigned to Amazon, and cipher 2 to the New York Times according to blanks 212. Similarly, blanks 242 on the second side 240 of card 200 shows that the third cipher is assigned to Wells Fargo, and the fourth cipher to PayPal.

In FIG. 2, the ciphers take the form of a substitution cipher. A substitution cipher takes units of an input string and replaces those with different units in the encoded string. In its simplest form, a substitution cipher replaces each letter or character in an input string with a replacement letter or character. Variations allow a single input character to be replaced by two or more characters in the encoded string. Other variations analyze the input string by groups of two or more characters, such as by replacing a grouping of two characters in an input string with a different set of characters in the encoded string. In FIG. 2, each of the four ciphers is implemented as a simple substitution cipher in which a single input character is replaced with a single substitute character in the encoded string.

The printed card 200 implements these ciphers by displaying a table 220 that has a plurality of input columns 222, a plurality of first cipher columns 224, and a plurality of second cipher columns 226. To encode an input string using this table 220, each character of the input string is separately located in the input column 222. Once the character is found, a user looks to the right one or two spaces to find the replacement encode character for the first or second ciphers, respectively. For example, the input string "PASSWORD" would be converted to the string "VPuuv6iw" for the first cipher, and to "cYll5J9L" for the second cipher. In the preferred embodiment the three different types of columns are presented to the user using different colors, fonts, backgrounds, or sizes in order for the user to easily distinguish between the different column types 222, 224, 226.

Similarly, the second side 240 of the card 200 contains a second table 250 with input columns 252, third cipher columns 254, and fourth cipher columns 256. These columns can be used to encode an input string according to the third and fourth ciphers. The input string "PASSWORD" would encode to "dM77Zcu6" for the third cipher and to "CBkk4VLJ" for the fourth cipher. By providing blanks 212 242 for the user, the user is able to assign these four ciphers to four different service providers.

Note that the card does not contain any location for the user to write down the master password. The master password be memorized and not written down in order to maintain the security of the system. However, the user only needs to memorize one master password and carry around the password encode card 200 in order to securely access any of the services identified 212, 242 by the card. If the user's master password were "PASSWORD", the user would enter "dM77Zcu6" when establishing the password for their WellsFargo.com account. When they later wish to access the account again, they would again apply the third cipher to their master password and enter "dM77Zcu6" as their account password without ever needing to memorize the actual website password.

FIG. 2 shows a printed card 200 with two ciphers 224, 226 on a first side 210 of the card 200 and two ciphers 254, 256 on a second side 240 of the card. Other configurations of the card 200 are possible and are within the scope of the present invention. For example, the card 200 can be simplified so that only a single cipher appears on each side 210, 240 of the card 200. This allows the card 200 to have only one cipher column adjacent to each input column 222, which would simplify use of the card 200. Alternatively, the card 200 could be printed only on one side 210, or the card 200 might implement three or more ciphers per side 210, 240.

Figure 3:
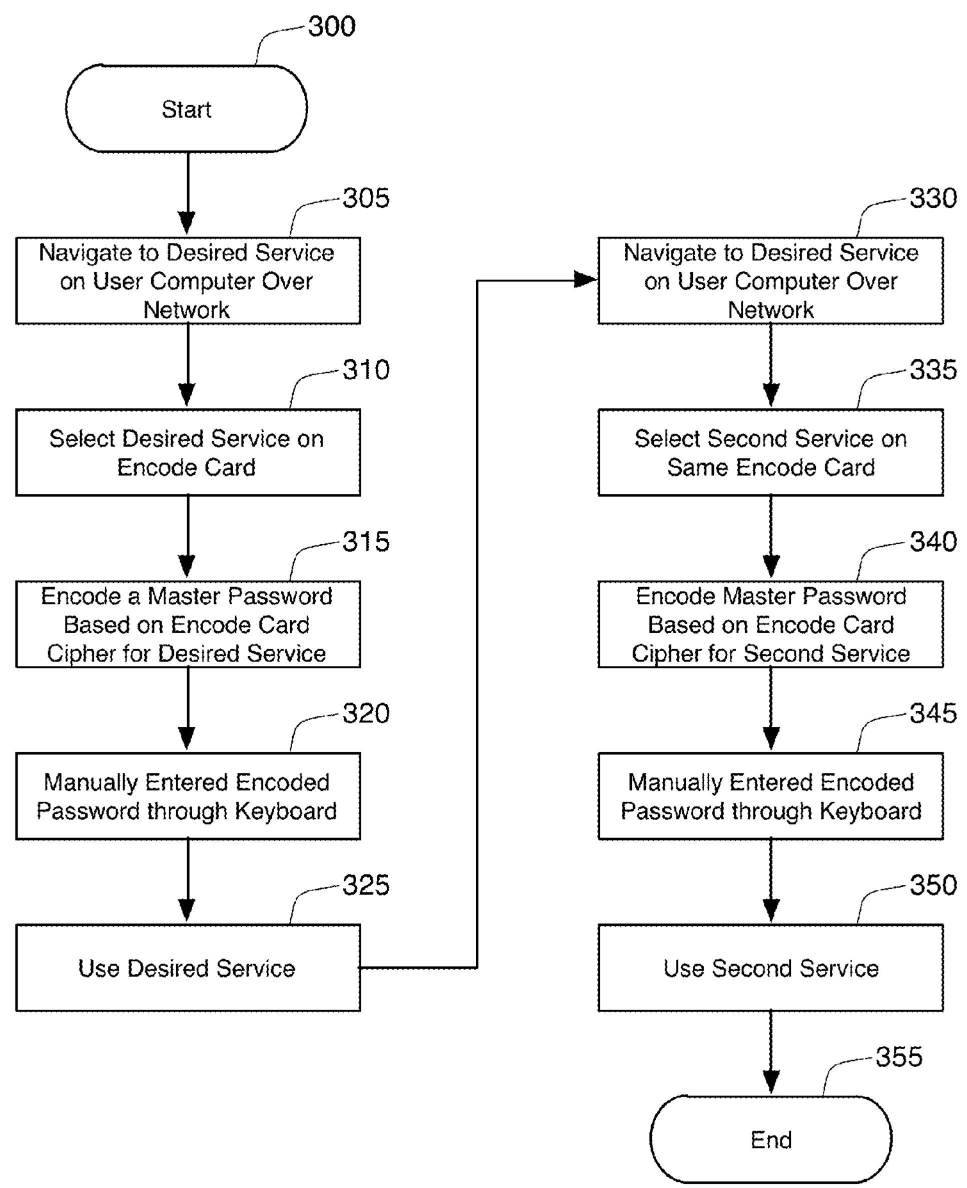
FIG. 3 is a flowchart showing a method that may be used to implement one embodiment of the present invention.

FIG. 3 shows a method 300 that can be used when using the password encode card 100, 200. The method 300 starts by using the user computer 120 to access a desired service over the wide area network 130 at step 305. For example, a user may connect to server 140 in order to access the services provided by this server 140. If server 140 were the WellsFargo.com server, the user would then review the password encode card 200 to find the Wells Fargo service at step 310. In this case, the card 200 indicates that the third cipher should be used for this server 140. At step 315, the user encodes their memorized master password by this identified cipher. For example, the master password "PASSWORD" is encoded to "dM77Zcu6". At step 320, the user types this password into the keyboard 110 when accessing the appropriate password field provided by the server 140. The keyboard 110 communicates the encoded password to the user computing device 120, which transmits the encoded password to the server 140 in order to authenticate the user. Assuming that the user used the same master password and cipher when first entering the password at the server 140, the server 140 will then grant access to the user. The user may then take advantage of the provided services at step 325.

One benefit of using the password encode card 100 is that multiple ciphers can be accessed using a single card. Thus, when the user wishes to access the services of a second server, such as server 150, the user will navigate to the server 150 using their computing device 120 at step 330. When the server 150 requests the user's password, the user will access the card to find this second service provider at step 335. They may then encode the master password based on the cipher for this service provider at step 240, and type this encoded password into the keyboard 110 at step 345. The server 150 then provides access to its services to the user at step 350, and the method 350 ends at step 355.

Figure 4:
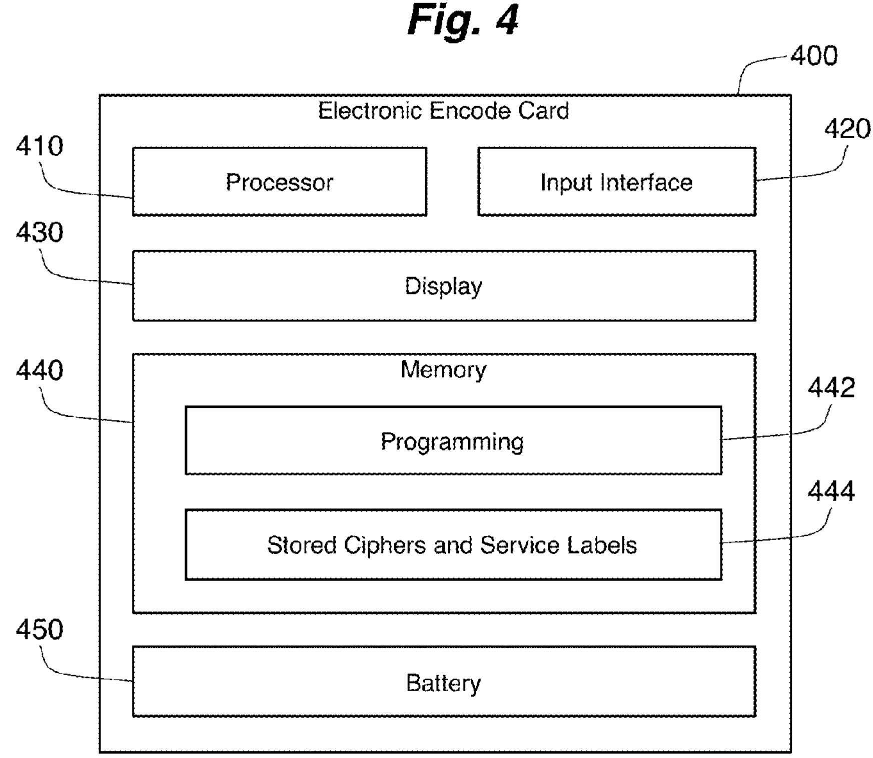
FIG. 4 is a schematic diagram showing the primary components of an electronic password encode card.
Figure 5:
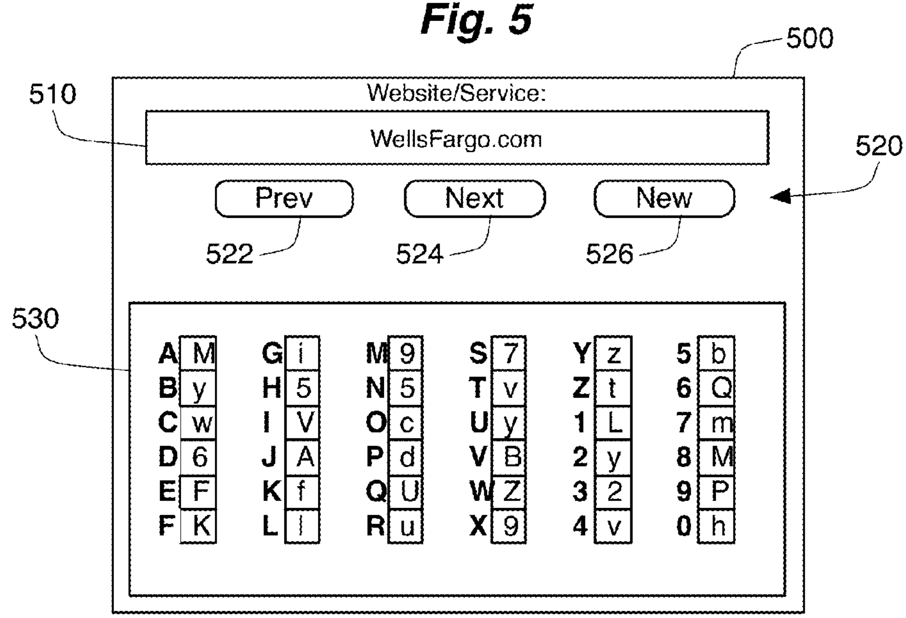
FIG. 5 is a front plan view of a first embodiment of an electronic password encode card.
Figure 6:
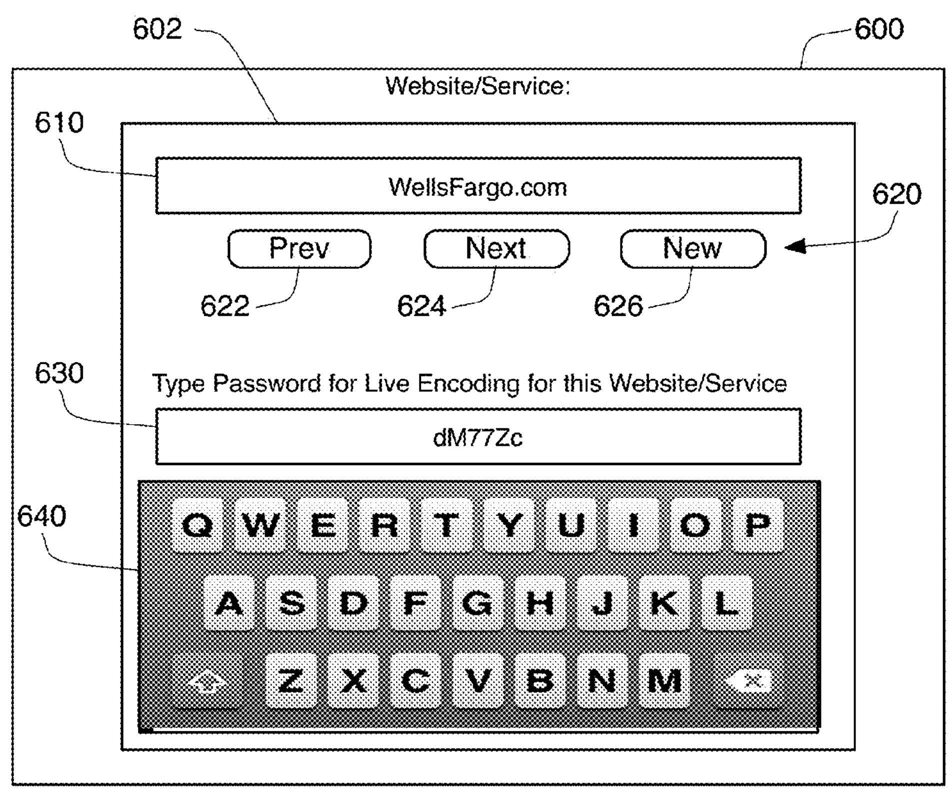
FIG. 6 is a front plan view of a second embodiment of an electronic password encode card.

This method 300 not only works with a printed version of the password encode card 200 shown in FIG. 2, but also with an electronic version of the password encode card shown in FIGS. 4 through 6. FIG. 4 shows an electronic password encode card 400 that contains a processor 410, an input interface 420, a display 430, a tangible, non-transitory memory 440, and a battery 450. The input interface may take the form of a touch screen interface, in which the input interface 420 and the display 430 are integrated into a single element on card 400. Alternatively, the input interface 420 may take other forms as known in the prior art, such as keystrokes on an integrated keypad or buttons integrated into the card 400. The battery 450 is designed to provide power to the other components 410, 420, 430, 440 of the card 400. The memory 440 preferable is non-volatile memory, such as flash memory, meaning that the memory 440 does not need to draw power from the battery 450 in order to remember its contents.

The processor 410 operates under the control of programming 442. This programming 442 may be found in the non-transitory memory 440, which would allow the processor 410 to take the form of a general purpose CPU such as those described above in connection with user computer 120. Alternatively, the programming 442 and the processor 410 may be constructed together in the form of a field programmable gate array (or FPGA) circuit or an application-specific integrated circuit (ASIC) that has been specially configured to perform according to a pre-set algorithm.

The card 400 is designed to automatically generate or assign a new cipher upon a user request received through the input interface 420. If the cipher is a substitution cipher, the processor 410 whenever requested by the user generates a new set of substitutions for input characters. This new cipher can be created randomly using an algorithm found in programming 442. Alternatively, a plurality of ciphers can be pre-stored within memory 440 and simply assigned to a new service whenever the user requests a new cipher. When a user requests that a new cipher be created, the user is also requested to input a label for the service provider or server that will be associated with that cipher. The new cipher and the service label are then stored in association with each other in memory 440 as element 444. When the user wishes to use a stored cipher, they use the input and display interfaces 420, 430 to select among the various ciphers 444 stored in memory 440.

FIGS. 5 and 6 show two example embodiments of input interfaces 420 and display interfaces 430 as embodied in example electronic encode cards 500, 600. Card 500 uses physical buttons 520 as part of its input interface 420. The user presses the previous and next buttons 522, 524 to navigate through the stored ciphers 444. In card 500, the display interface 430 is divided into two sub-displays. The first sub-display 510 shows the label or name of the currently selected cipher. As shown in FIG. 5, the cipher for WellsFargo.com is currently selected. A second sub-display 530 shows to the user the substitution cipher for Wells Fargo. In one embodiment, the two sub-displays 510, 520 are formed using separate LCD, LED, or OLED displays. In another embodiment, the cipher table 530 contains a printed portion in which the input characters are printed onto the face of the card 500, and a plurality of small displays each located adjacent to a different printed input character. As the user selects among the different stored ciphers, the individual displays are updated to reflect the new substitution characters for the printed input character.

FIG. 6 shows another electronic encode card 600, this one having a large touchscreen interface 602 that provides all of the input 420 and display 430 interfaces. The touchscreen 602 has a first area 610, which displays the label for the currently selected cipher, and a plurality of button areas 620 where a user can alter the cipher to the previous or next in the list (buttons 622, 624, respectively) or create a new cipher 626. Instead of displaying the substitution cipher for the selected service 610, this card 600 provides an input keyboard 640 that allows a user to type in the memorized master password. The card 600 uses the stored cipher to encode the typed-in password and then displays the encoded password at area 630. In FIG. 6, area 630 shows the encoded password "dM77Zc", which would be the encoding for the input "PASSWO" for the Wells Fargo ciphers shown in FIGS. 2 and 5. If the user were inputting "PASSWORD", they would need to finish the input by typing "R" and "D", and the encoded display area 630 would then show "dM77Zcu6". Note that display 602 does not show the typed-in master password, only the encoded text 630. This gives the master password greater privacy protection, as a nearby person could not determine the master password in a single quick glance simply by looking over the shoulder of the user. In another embodiment, the electronic encode card 400 would utilize a timer to determine the time period since the last character of the input master password was input into the keyboard 640. If this time exceeds a preset time limit (such as two minutes), the encoded text portion 630 would be blanked and the card 600 would forget the inputted text. This ensures that a lost card 600 would not display to the person finding the card 600 a password for a service 610 for longer than this preset time period.

To create a new cipher, the user will hit the new button area 626 of the touchscreen 602. The processor 410 then creates a new cipher, and the user is asked to input a label for the cipher using the provided keyboard area 640 of screen 602. Additional buttons 620 could be displayed while the user is inputting the cipher label, such as the "cancel" button to cancel the creation of the new cipher, or a "done" button to indicate that the entry of the label text is complete. Obviously, additional buttons could be displayed at other times, such as a delete button that would delete the currently displayed cipher, or a search button, that would allow a user to input text into a search field to locate a cipher having a particular label. The ability to display a variety of buttons and user interface elements is one of the primary advantages of the touchscreen display 602 of card 600.

Card 500, in contrast, must make do with a limited set of input buttons 520 as the input interface 420. This makes it more difficult to create a new cipher, as a full keyboard is not provided for input of the cipher label. To increase the flexibility of the buttons 520, one alternative is to have a single button 522, 524, 526 perform different functions depending on the state of the card 500. This can be accomplished by creating "soft labels" on the display screen 510 above (or otherwise near) the buttons 520. In normal use, the buttons might be labeled "Prey", "Next", and "Edit". If the user presses the edit button, the buttons might then be labeled "Delete", "New", and "Done". If the user presses the Delete button, the currently selected cipher would be deleted (in some embodiments only after a confirmation step). When the user presses the "New" button, the labels could change to allow selection of input letters and indicate that the text input is done.

Another advantage to the input and display interfaces 420, 430 of the electronic encode card 600 shown in FIG. 6 is that it is possible to implement more complicated substitution ciphers. For example, input character pairs could be used as inputs to the substitution cipher, and the output encode strings do not have to equal the same length as the input string. Thus, the input "PA" could be encoded as "uF32", or the input "4" could be encoded as "eF". Furthermore, as shown in FIGS. 2 and 5, the input characters are treated as case-insensitive, meaning that small and capital letters in the input string were treated identically. This limitation was required in order to decrease the size of the cipher tables. In card 600, the implementation is done internally, which means that there is no need to limit the size of the cipher table and input strings can be treated in a case-sensitive manner. In addition, the cipher algorithm used in the card 600 can be more complex in nature, as the card 600 does not require the individual to perform the encode process themselves. This may allow the cipher to mix up the order of the substituted characters in a predictable pattern, or even to use ciphers that are not substitution ciphers. Numerous encryption schemes might be implemented, requiring only that the output encoded text be of a limited size and use standard keyboard characters to allow easy input into the keyboard 110.

Figure 7:
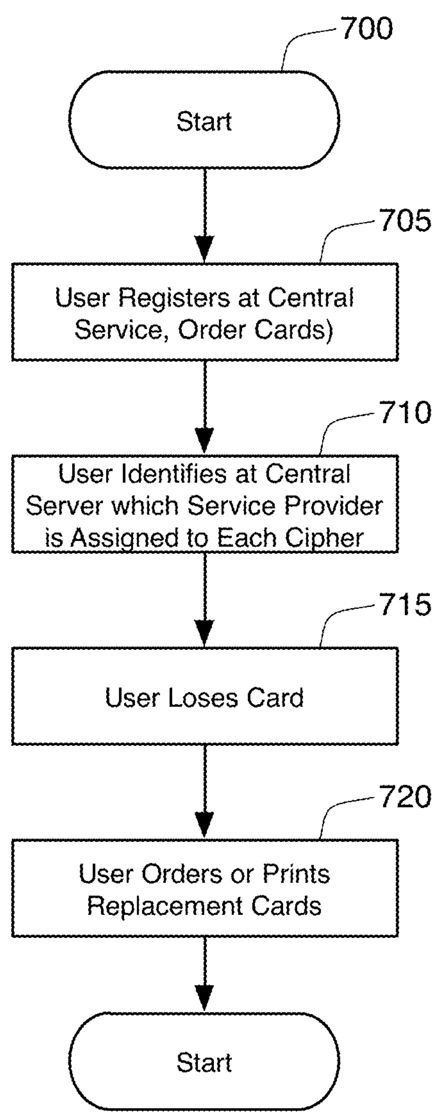
FIG. 7 is a flowchart showing a method for tracking assigned ciphers for replacement cards.

To avoid problems when a encode card 100 is lost, the system 10 can be implemented so that duplicate password encode cards 100 are always provided whenever the card 100 is originally distributed to a user. It is also possible to track which ciphers have been assigned to which service provider for a particular user in order to create a new replacement card. One method 700 of creating a replacement card is shown in FIG. 7. This first step 705 of this method is to have the user register at a central server when ordering one or more encode cards 100. If the cards are printed cards 200, the central server can either ship the desired cards to the user, or provide images of the cards through a computerized interface so that the user can print the card images themselves using user computer 120. Electronic cards 400 can be shipped to the user. Either way, the server will track the ciphers encoded onto these cards and identify those particular ciphers with that user.

In another embodiment, the cards 100 may be purchased at a physical retail store. In this case, the user will be encouraged to register the cards as part of step 705, so that an identifier (such as a serial number) associated with the cards can be input at the central server and associated with that particular user. This serial number can then be associated with a particular set of ciphers that are found on the user's card.

At step 710, the user can inform the central service which cipher on their card 100 is assigned to which service provider. For instance, the user associated with card 200 will identifier cipher 1 as belonging to Amazon, cipher 2 as belonging to the NY Times, etc. In the context of an electronic card, this can be accomplished by assigning the ciphers on the card 400 to numbers (cipher 1, cipher 2), and informing the user which cipher is being used when presenting the labels 510, 610 to the user.

If the user loses their card (step 715), they need only log into the central server and request a replacement card at step 720. They will then be shipped a replacement card (or shown an image of a replacement card for printing). In the case of electronic cards 400, it is possible that each card has a particular serial number, and that this serial number is associated with a unique set of ciphers. In this environment, it would be necessary to ship a replacement card having the same serial number (and consequently the same set of algorithms) whenever a user requests a replacement. Because it would be impractical to keep an inventory of cards of every serial number in order to be able to provide a replacement, a technical workaround may be implemented. One such workaround allows any electronic card 400 to be associated with any set of ciphers merely by typing the serial number into the card. For instance, a user may purchase an electronic encode card 400 with a serial number of 7131412. This serial number is associated with a unique set of ciphers. When the user requests a replacement of that card, a generic card 400 is sent to the user with instructions to input serial number 7131412 into the card. When the card receives its new serial number, it then presents the same cipher algorithms to the user as the original card.

The user may then use the cipher assignments recorded at step 710 to reassign the ciphers to their respective service providers to complete the replacement process. Note that it is not necessary that each encode card be completely unique, as the actual encoded passwords used at the websites will always depend on the application of the different ciphers to the master password. Nonetheless, it is preferred that there be a great variety of ciphers on the cipher cards in order to prevent hackers from using common ciphers to guess a user's password.

Note that method 700 may be rendered unnecessary for electronic encode cards 400 if the cards 400 are able to back up their ciphers and labels 444 in a meaningful way. For example, a USB interface may be provided to allow this information 444 to be stored in a local computer or at a central server. In this way, any generic encode card 400 could be used to replace a lost card simply by copying the backed-up data 444 onto the generic replacement card 400.

The system and methods described above are exemplary and are not the exclusive techniques for using the disclosed embodiments. Numerous modifications and variations will readily occur to those skilled in the art. Because such modifications are possible, the invention is not to be limited to the exact construction and operation illustrated and described. Rather, the present invention should be limited only by the following claims.

What is claimed is:

1. A method of encoding a password in an electronic login process over a computerized network comprising:

a) at a user computer, accessing the computerized network to navigate to a login page of a first desired service;

b) selecting the first desired service on a physical password encode card, wherein the selection of the first desired service further comprises selecting a first substitution cipher that translates input characters into encoded characters, further wherein the physical password encode card provides for the selection of a plurality of desired services each having a different substitution cipher;

c) using the first substitution cipher provided by the physical password encode card to encode only a master password into a first encoded master password;

d) inputting the first encoded master password into the user computer; and e) at the user computer, transmitting the first encoded master password to the login page of the first desired service over the computerized network.

2. The method of claim 1, further comprising:

f) at the user computer, accessing the computerized network to navigate to the login page of a second desired service that is different from the first desired service;

g) selecting the second desired service on the physical password encode card, wherein the selection of the second desired service further comprises selecting a second substitution cipher that translates input characters into encoded characters, wherein the second substitution cipher is different from the first substitution cipher;

h) using the second substitution cipher provided by the physical password encode card to encode only the master password into a second encoded master password that is different from the first encoded master password;

i) inputting the second encoded master password into the user computer; and j) at the user computer, transmitting the second encoded master password to the login page of the second desired service over the computerized network.

3. The method of claim 1, wherein the physical password encode card is a printed card having a plurality of substitution ciphers each associated with a different desired service.

4. The method of claim 3, wherein each character in the master password is encoded into a different character by the substitution ciphers.

5. The method of claim 4, wherein the plurality of substitution ciphers are combined with possible master password characters into a table printed on the physical password encode card.

6. The method of claim 3, wherein a single character in the master password is identified with a plurality of characters in at least one of the plurality of substitution ciphers.

7. The method of claim 3, wherein the physical password encode card is printed on two sides with multiple substitution ciphers on each side.

8. The method of claim 1, wherein the physical password encode card comprises a processor, a battery, a display, programming for the processor, and memory containing the first substitution cipher.

9. The method of claim 8, further wherein a first label for the first desired service is displayed on the display for the physical password encode card after the first desired service is selected.

10. The method of claim 9, wherein an input device on the physical password encode card allows a user to select among the plurality of desired services with the selected desired service displayed on the display changing as input is received over the input devices.

11. The method of claim 10, further comprising:

f) at the physical password encode card, receiving a request to generate a new cipher;

g) at the physical password encode card, generating a second substitution cipher;

h) at the physical password encode card, receiving a label for the second substitution cipher; and i) at the physical password encode card, storing the second substitution cipher and the label in the memory for later recall.

12. The method of claim 9, wherein the display further displays a table that relates a character from the master password with a different character for the first substitution cipher.

13. The method of claim 9, wherein the physical password encode card further comprises a keyboard input, and wherein step c) further comprises inputting each character of the master password through the keyboard input and displaying the first encoded master password on the display of the physical password encode card.

14. The method of claim 13, wherein the display does not display the inputted master password.

15. The method of claim 14, wherein the display stops displaying the first encoded master password after a predetermined time period.

16. An electronic password encode card comprising:

a) a processor;

b) a display;

c) non-volatile memory containing a plurality of substitution ciphers, each substitution cipher being associated in the memory with a desired service label;

d) a battery providing power to the processor, the display, and the non-volatile memory; and e) programming to instruct the processor to:

i) receive selection inputs to allow a user to select from the plurality of substitution ciphers, ii) display on the display the selected service label for the selected substitution cipher, iii) display on the display a conversion chart for the selected substitution cipher that displays a conversion for each character of a master password into at least one encoded character.

17. The electronic password encode card of claim 16, wherein the display comprises a first sub-display and a separate, second sub-display, further wherein the selected service label is displayed on the first sub-display and the conversion chart is displayed on the second sub-display.

18. The electronic password encode card of claim 16, further comprising a plurality of buttons to receive the selection inputs.

19. An electronic password encode card comprising:

a) a processor;

b) a display;

c) non-volatile memory containing a plurality of substitution ciphers, each substitution cipher being associated in the memory with a desired service label;

d) a battery providing power to the processor, the display, and the non-volatile memory; and e) programming to instruct the processor to:

i) receive selection inputs to allow a user to select from the plurality of substitution ciphers, ii) display on the display the selected service label for the selected substitution cipher, iii) receiving character inputs of a master password;

iv) display on the display an encoded version of the master password encoded pursuant to the selected substitution cipher.

20. The electronic password encode card of claim 19, wherein the characters of the master password are not displayed by the electronic password encode card.

21. The electronic password encode card of claim 19, wherein, after a predetermined time period, the programming instructs the processor to stop displaying the encoded version of the master password and to forget the received character inputs of the master password.

* * * * *